Oct. 16, 1945.    A. C. HUGIN    2,387,063
DYNAMOELECTRIC MACHINE
Filed June 1, 1944
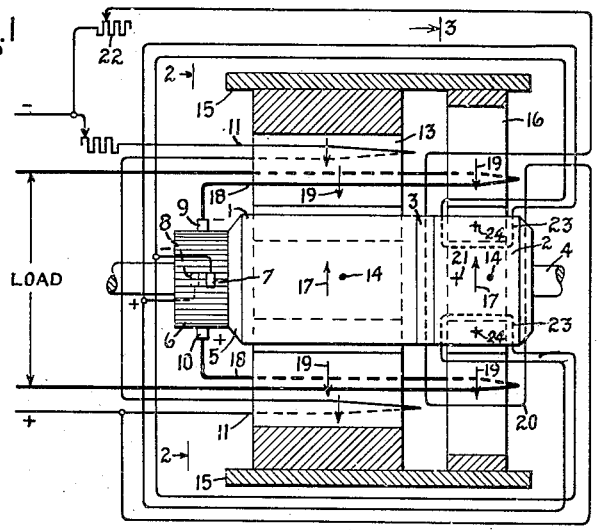
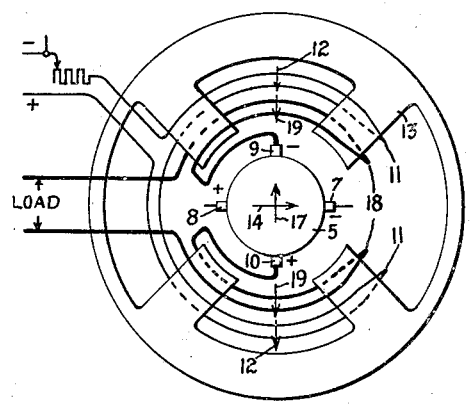
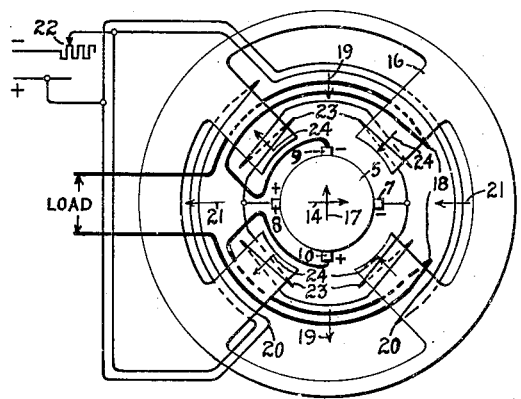
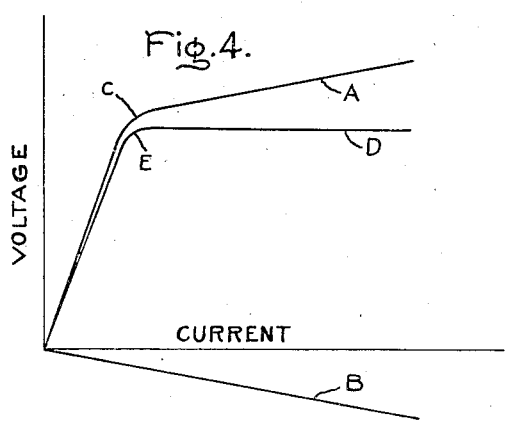
Inventor:
Adolph C. Hugin,
by Harry E. Dunham
His Attorney.

Patented Oct. 16, 1945

2,387,063

UNITED STATES PATENT OFFICE 2,387,063

DYNAMOELECTRIC MACHINE

Adolph C. Hugin, Schenectady, N. Y., assignor to General Electric Company, a corporation of New York Application June 1, 1944, Serial No. 538,258

14 Claims. (Cl. 171—223)

My invention relates to direct current commutator type dynamoelectric machines and particularly to a generator having an excitation system for providing the machine with a maximum limiting voltage.

An object of my invention is to provide an improved dynamoelectric machine with means for limiting the maximum voltage thereof to a substantially predetermined value.

Another object of my invention is to provide an armature reaction excited dynamoelectric machine with means for limiting the maximum voltage thereof to a substantially predetermined value.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a schematic side elevational view of a dynamoelectric machine provided with an embodiment of my invention; Fig. 2 is a schematic view of the machine shown in Fig. 1 illustrating the left-hand portion of the machine as viewed along line 2—2; Fig. 3 is a schematic view of the machine shown in Fig. 1 illustrating the right-hand portion of the machine as viewed along line 3—3; and Fig. 4 illustrates characteristics of the machine shown in the other figures.

Referring to the drawing, I have shown in Figs. 1, 2, and 3 an armature reaction excited dynamoelectric machine of the type described in Patent 2,227,992, Alexanderson and Edwards, January 7, 1941, provided with a rotatable member or armature having a core of magnetic material formed as two magnetically substantially separate sections 1 and 2 separated by a non-magnetic separator element 3. These core sections are mounted upon a shaft 4 and may be separated from this shaft by a sleeve or a bushing of non-magnetic material in order to assure the magnetic separation of the two core sections 1 and 2. This armature is of the conventional direct current type provided with a winding 5 in both sections of the core electrically connected to the segments of a commutator 6 and adapted to be driven by any suitable source of mechanical power.

In dynamoelectric machines of the armature reaction excited type, a set of primary or quadrature brushes is arranged to provide substantially a short circuit through the armatures. In the illustrated arrangement, a set of primary brushes 7 and 8 is arranged in contact with the commutator 6 to provide a substantially short-circuited primary circuit through the armature by an external circuit including a field exciting winding, and a set of secondary or load brushes 9 and 10 is arranged in contact with the commutator 6 and displaced thereabout substantially 90 electrical degrees from the primary brushes 7 and 8 to provide a secondary circuit through the armature which is adapted to be connected to the load on the machine.

In order to control the secondary or load characteristics of the generator, a control field exciting winding 11 is arranged to provide a resultant component of magnetic excitation along the secondary commutating axis of the machine as indicated by the arrow 12 and is arranged about a core pole section 13 of the stationary member over the rotatable member core section 1 to provide magnetic poles over the rotatable member core section 1. The excitation which is provided by the control field exciting winding 11 induces an electromotive force in the armature winding between the primary brushes 7 and 8 which causes a current to flow through the armature primary short circuit and produces a component of primary armature reaction excitation indicated by the arrow 14. This primary armature reaction 14 will be produced in both core sections 1 and 2 of the armature, and this component of excitation in the rotatable member core section 1 is completed through the stationary core section pole pieces 13 which are supported in a stationary member frame 15, preferably of non-magnetic material or of magnetic material of relatively small section, which also supports other stationary member core section pole pieces 16 to provide substantially magnetically separate sets of pole pieces 13 and 16 for the stationary member of the machine. Rotation of the armature in the field of the primary armature reaction 14 induces an electromotive force between the secondary or load brushes 9 and 10 such that the excitation provided by the control field exciting winding 11 produces and controls a component of voltage in the rotatable member winding 5 between the load brushes 9 and 10. When these brushes are connected to a load, an electric current will flow through the armature circuit and will produce a secondary component of armature reaction, as indicated by the arrow 17, which is opposed to the control component of excitation 12. The sensitivity of the control field exciting winding 11 in this type machine is increased by substantially neutralizing the secondary component of armature reaction 17 by providing a secondary or load compensating field exciting winding 18 arranged about the stationary pole pieces 13 and connecting this field exciting winding in the secondary or load circuit of the armature to provide a resultant component of excitation, as indicated by the arrows 19, substantially equal and opposite to the secondary component of armature reaction 17 substantially to neutralize this component of armature reaction. With this arrangement, the excitation provided to the armature winding 5 by the stationary pole pieces 13 produces a voltage characteristic as indicated by the curve A in Fig. 4. This is the conventional type saturation curve for a D. C. generator.

Under certain conditions, it is desirable that the voltage of a generator should be limited to a predetermined maximum substantially constant value and various regulators have been used to provide this characteristic. In order to provide an inherent regulation to my improved machine which will limit the voltage of the machine substantially to a predetermined maximum and constant value, a differential field exciting winding 20 is arranged around pole pieces 16 of the stationary member to provide the required differential voltage in the armature winding 5. This field exciting winding is adapted to provide a resultant component of excitation, indicated by the arrows 21 to the section 2 of the rotatable member core which is adapted to induce a component of voltage in the rotatable member winding 5 in opposition to the component of voltage produced at the load brushes 9 and 10 by the excitation provided by the primary armature reaction 14 as controlled by the main control field exciting winding 11. This differential field exciting winding 20 is connected across the same source of voltage supply as the control field exciting winding 11 through a variable resistor 22 for controlling the energization provided to the winding and is adapted to induce a differential voltage in the armature winding as indicated by curve B as shown in Fig. 4. In order to assure an accurate response to the energization provided by a field exciting winding 20, it is desirable that this component of excitation should be substantially the only component of excitation affecting the magnetic circuit of part 2 of the armature. Since the primary current which flows through the primary brushes 7 and 8 passes through the full length of the armature conductors, the primary component of armature reaction 14 is present in both parts of the magnetic circuit. In order to eliminate the effect of this primary component of armature reaction 14 from the part 2 of the armature and from the field pole pieces 16, a field exciting winding 23 is arranged on the pole pieces 16 which produces components of excitation indicated by the arrows 24 which provide a resultant excitation substantially equal and opposite to the primary component of armature reaction 14 and thereby eliminates its effect on this part of the magnetic circuit of the machine. The load compensating field exciting winding 18 also extends about the pole pieces 16 and provides a component of excitation substantially equal and opposite to the secondary component of armature reaction 17 which is set up by the flow of load current through the armature conductors in part 2 of the armature. Thus, the field exciting windings 23 and 18 effectively eliminate both the primary and secondary components of armature reaction in part 2 of the armature due to the flow of the primary current through the brushes 7 and 8 and the flow of load current from the brushes 9 and 10. The turns of the differential field exciting winding 20 and the energization of this winding are adapted to provide excitation to the field pole pieces 16 and to part 2 of the armature without producing saturation of this magnetic circuit. This is indicated by the straight line which forms curve B in Fig. 4, and the excitation produced by this field exciting winding is such as to induce voltage in the armature conductors which increases at substantially the same rate as the increase in voltage in part 1 of the armature above the saturation point C of curve A in Fig. 4 for part 1 of the armature. Since the voltage in the armature conductors in part 1 of the armature increases very rapidly up to the saturation point C and the voltage induced in part 2 of the armature increases very gradually over its entire range, the resultant voltage at the secondary or load brushes 9 and 10 is affected very little by the differential component of excitation B up to the saturation point, as indicated by that portion of the characteristic curve D below the saturation point E. This curve D represents the net or resultant voltage at the secondary or load brushes of the machine and is equal to the difference between the voltages induced in parts 1 and 2 of the armature between the secondary brushes 9 and 10. Since the increase in voltage above the saturation point C in curve A is essentially equal and opposite to the increase in voltage of curve B, the net or resultant voltage between the secondary brushes 9 and 10 remains substantially constant above the saturation point E or "knee" of curve D. Thus, the resultant load voltage of the armature winding 18 is inherently limited to a maximum predetermined substantially constant value without the use of any external mechanical voltage regulating devices. By varying the amount of excitation provided by the field exciting winding 20, the slope of the curve B may be changed so that the resultant voltage across the load brushes may be made to rise slightly or to fall slightly if this is desired. However, in any case, the variations of the energization of the field 20 must correspond to variations in the energization of the main control field exciting winding 11.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine including a stationary member and a rotatable member having a core of magnetic material, means for dividing said rotatable member core into a pair of magnetically substantially separate sections, a winding in both sections of said rotatable member core, a commutator connected to said winding, means including a field exciting winding providing a control component of excitation to one of said rotatable member sections for controlling the voltage of said machine, and means providing a component of excitation to the other of said ro- ιatable member sections for limiting the maximum voltage of said machine to a substantially predetermined value with variations in the current in said rotatable member.

2. A dynamoelectric machine including a stationary member and a rotatable member having a core of magnetic material, means including a non-magnetic spacer in said core for dividing said rotatable member core into a pair of magnetically substantially separate sections, a winding in said rotatable member core, a commutator connected to said winding, means including a field exciting winding providing a control component of excitation to one of said rotatable member sections for controlling the voltage of said machine, and means providing a component of excitation to the other of said rotatable member sections in opposition to the component of excitation provided by said control field exciting winding to said one section for limiting the maximum voltage of said machine to a substantially predetermined value with variations in the current in said rotatable member.

3. A dynamoelectric machine including a stationary member and a rotatable member having a core of magnetic material, means including a non-magnetic spacer in said core for dividing said core into a pair of substantially separate magnetic circuits, a winding in said rotatable member core, a commutator connected to said winding, load brushes for said commutator, means including a field exciting winding providing a control component of excitation to one of said magnetic circuits for controlling the voltage of said machine, and means including a second field exciting winding providing a component of excitation to the other of said magnetic circuits for inducing a component of voltage in said rotatable member winding substantially equal and opposite to the component of voltage produced at said load brushes by excitation of said control field exciting winding above substantial saturation of said first-mentioned magnetic circuit member for providing a substantially constant and predetermined maximum voltage to said machine above said saturation with variations in the current in said rotatable member.

4. A dynamoelectric machine including a stationary member and a rotatable member having a core of magnetic material, means including a non-magnetic spacer in said core for dividing said core into a pair of magnetically substantially separate sections, a winding in said rotatable member core, a commutator connected to said winding, load brushes for said commutator, means including a field exciting winding providing a control component of excitation to one of said rotatable member sections for controlling the voltage of said machine, and means including a second field exciting winding providing a component of excitation to the other of said rotatable member sections for inducing a component of voltage in said rotatable member winding in opposition to the component of voltage produced at said load brushes by the excitation provided by said control field exciting winding to said one section for providing a substantially predetermined maximum voltage to said machine with variations in the current in said rotatable member.

5. A dynamoelectric machine including a stationary member and a rotatable member having a core of magnetic material, means including a nonmagnetic spacer in said core for dividing said core into a pair of magnetically substantially separate sections, a winding in said rotatable member core, a commutator connected to said winding, means including a field exciting winding providing a control component of excitation to one of said rotatable member sections for controlling the voltage of said machine, and means including a second field exciting winding providing a component of excitation to the other of said rotatable member sections variable with and substantially equal and opposite to the increase in excitation of said control field exciting winding above substantial saturation of said first-mentioned rotatable core section for providing a substantially predetermined maximum voltage to said machine with variations in the current in said rotatable member.

6. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each of said rotatable member core sections providing two substantially separate magnetic circuits, a control field exciting winding arranged to excite one of said magnetic circuits, means for substantially neutralizing secondary armature reaction in said control magnetic circuit due to electric current in said rotatable member secondary circuit, and means for providing a component of excitation to the other of said magnetic circuits substantially inversely variable with the excitation of said control field exciting winding above substantial saturation of said one magnetic circuit for limiting the maximum voltage of said machine to a substantially predetermined value.

7. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including exciting poles over each rotatable member core section, a control field exciting winding arranged to excite said stationary exciting poles over one of said rotatable member core sections, means for substantially neutralizing secondary armature reaction in said control stationary member poles due to electric current in said rotatable member secondary circuit, and means including a second field exciting winding for providing a component of excitation to the other of said rotatable member sections for inducing a component of voltage in said rotatable member winding substantially equal and opposite to the component of voltage produced at said secondary brushes by the excitation of said control field exciting winding above substantial saturation of said first-mentioned rotatable member core section for limiting the maximum voltage of said machine to a substantially constant predetermined value above said saturation.

8. A dynamoelectric machine including a stationary member and a rotatable member having a core of magnetic material, means including a nonmagnetic spacer in said core for dividing said core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means for substantially neutralizing secondary armature reaction in said control stationary core section due to electric current in said rotatable member secondary circuit, and means for providing a component of excitation to the other of said rotatable member sections for inducing a component of voltage in said rotatable member winding in opposition to the component of voltage produced at said secondary brushes by the excitation provided by said control field exciting winding for providing a substantially constant predetermined maximum voltage to said machine.

9. A dynamoelectric machine including a stationary member and a rotatable member having a core of magnetic material, means including a nonmagnetic spacer in said core for dividing said core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means for substantially neutralizing secondary armature reaction in said machine due to electric current in said rotatable member secondary circuit, and means for providing a component of excitation to the other of said rotatable member sections in opposition to the excitation provided by said control field exciting winding to said one section for providing a substantially predetermined maximum voltage to said machine.

10. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including exciting poles over each rotatable member core section, a control field exciting winding arranged to excite said stationary exciting poles over one of said rotatable member core sections, means for substantially neutralizing secondary armature reaction in said control stationary member poles due to electric current in said rotatable member secondary circuit, and means including a second field exciting winding for providing a component of excitation to the other of said rotatable member sections for inducing a component of voltage in said rotatable member winding, variable with and substantially equal and opposite to the component of voltage produced at said secondary brushes by the excitation of said control field exciting winding above substantial saturation of said first-mentioned rotatable member core section for limiting the maximum voltage of said machine to a substantially predetermined value.

11. A dynamoelectric machine including a stationary member and a rotatable member having a core of magnetic material, means including a nonmagnetic spacer in said core for dividing said core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means for substantially neutralizing secondary armature reaction in said control stationary core section due to electric current in said rotatable member secondary circuit, and means for providing a component of excitation to the other of said rotatable member sections variable with and opposite to the excitation of said control field exciting winding arranged to provide a substantially predetermined maximum voltage to said machine.

12. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section, a control field exciting winding arranged to excite said stationary core section over one of said rotatable member core sections, means including a second field exciting winding connected in said secondary circuit for substantially neutralizing secondary armature reaction in said control stationary core section due to electric current in said rotatable member secondary circuit, and means including a third field exciting winding for providing a component of excitation to the other of said rotatable member sections in opposition to the excitation provided by said control field exciting winding to said one section for providing a substantially predetermined maximum voltage to said machine.

13. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means including a second field exciting winding for substantially neutralizing secondary armature reaction in said control stationary core section due to electric current in said rotatable member secondary circuit, and means including a third field exciting winding for providing a component of excitation to the other of said rotatable member sections in opposition to the excitation provided by said control field exciting winding to said one section for providing a substantially predetermined maximum voltage to said machine.

14. A dynamoelectric machine including a stationary member and a rotatable member having a core of magnetic material, means including a nonmagnetic spacer in said core for dividing said core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means for substantially neutralizing secondary armature reaction in said control stationary core section due to electric current in said rotatable member secondary circuit, and means including a second field exciting winding for providing a component of excitation to the other of said rotatable member sections variable with and substantially equal and opposite to the excitation of said control field exciting winding above substantial saturation of said first-mentioned rotatable member core section for providing a substantially predetermined maximum voltage to said machine.

ADOLPH C. HUGIN.